Figure 1:
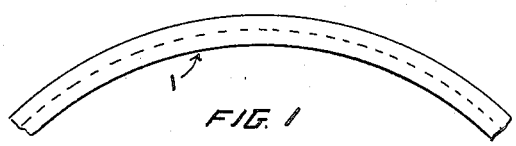

Jan. 6, 1925.

1,522,341

E. F. SUTTON

PISTON RING VACUUM OIL RELIEF

Filed Dec. 11, 1923

INVENTOR
E. F. SUTTON
BY Graves Griffith,
ATT'Y.

Patented Jan. 6, 1925.

1,522,341

UNITED STATES PATENT OFFICE.

EDWARD F. SUTTON, OF SAN FRANCISCO, CALIFORNIA.

PISTON-RING VACUUM OIL RELIEF.

Application filed December 11, 1923. Serial No. 679,886.

*To all whom it may concern:*

Be it known that I, EDWARD F. SUTTON, a citizen of the United States, and a resident of the city and county of San Francisco, and State of California, have invented certain new and useful Improvements in Piston-Ring Vacuum Oil Reliefs, of which the following is a specification.

The present invention relates to improvements in piston rings for internal combustion engines, and has for a principal object the provision of means for inducing such surplus oil as may have succeeded in entering the cylinder from the crank-shaft case to flow into prepared reservoirs and recesses, from which it is thereafter forced to return to the crank-shaft case.

In the accomplishment of the above purpose, reservoirs, recesses and conduits are created, through the medium of the piston ring and the piston groove bearing it, upon which alternate negative and positive pressures are brought to bear through the reciprocal action of the piston, wherethrough inductive and expulsive actions are induced that cause the surplus oil accumulations within the cylinder to flow thereinto and thereafter to be forced back into the crank-shaft case.

Structurally, the piston ring body carries exteriorly and circumferentially a chamfer of plane or grooved surface, and, interiorly, a series of recesses of, preferably, cone-shape, having for their purpose, in conjunction with the walls of the piston-ring groove, the formation of boundries for such reservoirs and recesses as may be required to meet varying conditions, as well as a plurality of conduits, or passages, extending obliquely from the chamfered surface through the body to the interior surface of the piston ring.

Economically considered, the piston ring thus constructed effects a heavy saving in the amount of lubricant required, removes the cause of spark-plug fouling and with it also that of all carbon deposits, while in no wise affecting or impairing the compression.

In the accompanying drawings forming a part of this specification, similar reference characters refer to like parts, throughout.

Figure 2:
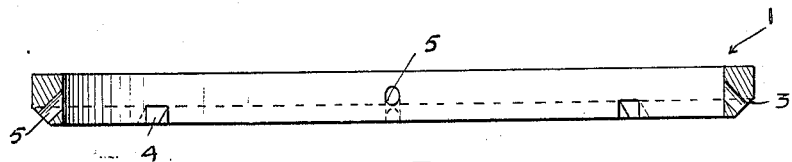
Figure 3:
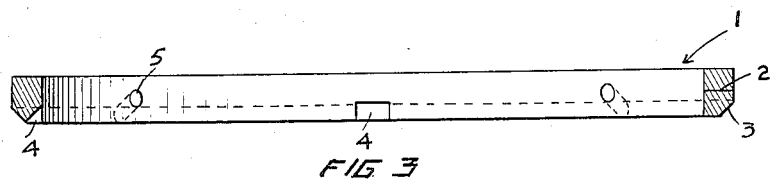
Figure 4:
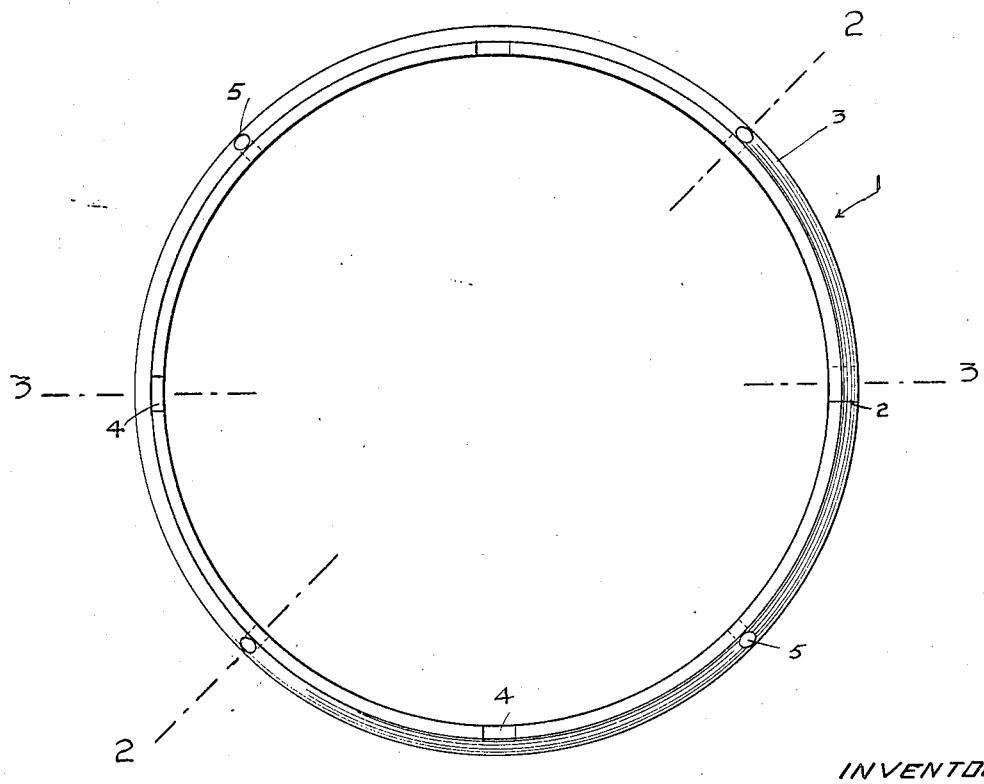

Figure 1 is a fragmentary plan of the body of the piston ring; Figure 2 is a section on line 2—2 of Figure 4; Figure 3 is a section on line 3—3 of Figure 4; and Figure 4 is a bottom plan of the ring.

Referring more particularly to the drawings, 1 indicates the body of the ring, 2 a step-opening in the body thereof, 3 the chamfered or beveled surface, 4 a series of sections recessed from inner surface of ring and preferably of conic form, and 5 a plurality of channels leading from the chamfered surface 3 obliquely through the body to the interior surface of the body of the ring.

The installation of the ring in its groove requires that the chamfered portion be placed downward, otherwise the piston will "freeze" through lack of lubrication—a condition impossible if rings be placed as required.

Having thus described my invention, I claim, and desire to secure by Letters Patent:

1. A piston ring having its outer face bevelled on the lower edge thereof, said ring having a plurality of oil accumulating recesses on the interior thereof and a plurality of oil draining channels extending from the bevelled edge upwardly to the interior of the ring.

2. A piston ring having a plurality of oil accumulating recesses on the inner face thereof and a plurality of oil draining channels extending downwardly through the ring from the inner face thereof to the exterior, said recesses being in spaced relation to said channels.

EDWARD F. SUTTON.